United States Patent [19]

Shyu

[11] Patent Number: 5,841,422
[45] Date of Patent: Nov. 24, 1998

[54] METHOD AND APPARATUS FOR REDUCING THE NUMBER OF MATRIX OPERATIONS WHEN CONVERTING RGB COLOR SPACE SIGNALS TO YCBCR COLOR SPACE SIGNALS

[75] Inventor: Rong-Fuh Shyu, Hsinchu, Taiwan

[73] Assignee: Winbond Electronics Corp., Hsinchu, Taiwan

[21] Appl. No.: 763,539

[22] Filed: Dec. 10, 1996

[51] Int. Cl.$^6$ ................................................ H04N 9/67
[52] U.S. Cl. .................... 345/154; 345/150; 348/577; 348/599
[58] Field of Search .................... 345/131, 150, 345/153, 154; 348/577, 582, 598, 599, 642; 382/162–167

[56] References Cited

U.S. PATENT DOCUMENTS

| | | | |
|---|---|---|---|
| 4,742,386 | 5/1988 | Wilkinson | 358/13 |
| 4,829,455 | 5/1989 | Long et al. | 364/521 |
| 5,124,688 | 6/1992 | Rumball | 340/703 |
| 5,504,821 | 4/1996 | Kanamori et al. | 382/167 |
| 5,510,852 | 4/1996 | Shyu | 348/660 |
| 5,541,658 | 7/1996 | Ishiwata | 348/394 |

*Primary Examiner*—Steven J. Saras
*Assistant Examiner*—Vincent E. Kovalick
*Attorney, Agent, or Firm*—Christie, Parker & Hale, LLP

[57] ABSTRACT

In a method and apparatus for reducing the number of matrix operations when converting digitized RGB color space signals to digitized YCbCr color space signals, at least two color difference signals, each being in terms of any two of the digitized RGB color space signals, are generated before performing first, second, third and fourth matrix multiplication operations of the color difference signals. The first and second matrix multiplication operations have first and second results to be used in conversion for the digitized Y color space signal. The third matrix multiplication operation has a third result to be used in conversion for the digitized Cb color space signal. The fourth matrix multiplication operation has a fourth result to be used in conversion for the digitized Cr color space signal.

25 Claims, 3 Drawing Sheets

METHOD AND APPARATUS FOR REDUCING THE NUMBER OF MATRIX OPERATIONS WHEN CONVERTING RGB COLOR SPACE SIGNALS TO YCBCR COLOR SPACE SIGNALS

BACKGROUND OF THE INVENTION

1. Field of the Invention

The invention relates to a method and apparatus for performing color space conversion, more particularly to a method and apparatus for reducing the number of matrix operations when converting digitized RGB color space signals to digitized YCbCr color space signals.

2. Description of the Related Art

Because signals in the Y (luminance), Cb and Cr (chrominance) color space have the advantage of being readily compressible, the result is a lower transmission bandwidth and a lower data storage requirement over signals in the R (red), G (green) and B (blue) color space, and color space conversion from RGB to YCbCr is frequently desired in image and video applications. CCIR 601, which was proposed by the Comite Consultalif International des Radio-communications (CCIR), establishes the following formulas for converting from the RGB color space to the YCbCr color space:

$$Y = 0.299R + 0.587G + 0.114B \quad (a.1)$$

$$Cb = 0.564(B-Y) + 128 \quad (a.2)$$

$$Cr = 0.713(R-Y) + 128 \quad (a.3)$$

Color space conversion is often implemented by employing multipliers or look-up tables to achieve the matrix multiplication operations, and by combining the resultant component products to complete the conversion. The matrix multiplication operations dominate the operating efficiency and the hardware complexity of a color space converting apparatus. Therefore, the number of matrix multiplication operations is crucial. A 3-by-3 multiplication matrix is typically used for converting between any two color spaces of three color components. Although such a multiplication matrix offers flexibility, it is relatively expensive to implement.

To perform the RGB to YCbCr color space conversion of Equations (a.1) to (a.3), a conventional color space converter needs to first perform three matrix multiplication operations to obtain the Y color signal, and then derive the (B-Y) and (R-Y) color difference signals before performing two more matrix multiplication operations to obtain the Cb and Cr color signals, respectively. Although the color space converter requires only five matrix multiplication operations that involve a relatively simple hardware, the operating efficiency of the color space converter is relatively poor since the matrix multiplication operations are done in two operating stages.

In order to improve the operating efficiency of the conventional color space converter, Equations (a.2) and (a.3) can be expanded so that the Cb and Cr color signals are entirely in terms of the R, G and B signals:

$$Cb = -0.169R - 0.331G + 0.5B + 128 \quad (b.1)$$

$$Cr = 0.5R - 0.419G - 0.081B + 128 \quad (b.2)$$

However, implementation of Equations (a.1), (b.1) and (b.2) requires nine matrix multiplication operations. Although the number of matrix multiplication operations can be reduced to seven by using an arithmetic right-shift operation to implement the two component products that have a coefficient of 0.5, the number of matrix multiplication operations is still more than that required in the implementation of Equations (a.1) to (a.3).

SUMMARY OF THE INVENTION

Therefore, the object of the present invention is to provide a method and apparatus for reducing the number of matrix operations when converting digitized RGB color space signals to digitized YCbCr color space signals, thus resulting in a cost-effective hardware implementation while maintaining a high operating efficiency.

Accordingly, using the characteristics of mutual complement between the coefficients of color component signals, the conversion formula for the Y color signal can be rearranged as follows by constructing two color difference signals in terms of any two of the R, G and B color signals in order to reduce the required number of matrix multiplication operations from three to two:

$$Y = R + 0.587(G-R) + 0.114(B-R) \quad (c.1)$$

$$Y = G + 0.299(R-G) + 0.114(B-G) \quad (c.2)$$

$$Y = B + 0.299(R-B) + 0.587(G-B) \quad (c.3)$$

The Cb and Cr conversion formulas can be similarly rewritten in the same manner as follows so as to require only one matrix multiplication operation and one arithmetic right-shift operation:

$$Cb = 0.5(B-G) + 0.169(G-R) + 128 \quad (d.1)$$

$$Cb = 0.5(B-R) + 0.331(R-G) + 128 \quad (d.2)$$

$$Cb = 0.5[(B-G) - 0.338(R-G)] + 128 \quad (d.3)$$

$$Cb = 0.5[(B-R) - 0.662(G-R)] + 128 \quad (d.4)$$

$$Cr = 0.5(R-G) + 0.081(G-B) + 128 \quad (e.1)$$

$$Cr = 0.5(R-B) + 0.419(B-G) + 128 \quad (e.2)$$

$$Cr = 0.5[(R-G) - 0.162(B-G)] + 128 \quad (e.3)$$

$$Cr = 0.5[(R-B) - 0.838(G-B)] + 128 \quad (e.4)$$

As such, by generating a set of color difference signals in terms of the R, G and B color signals, and by selecting an appropriate Y, Cb and Cr conversion formula, RGB to YCbCr color space conversion can be implemented using only four matrix multiplication operations in a single operating stage. Therefore, a relatively inexpensive and highly efficient color space converting method and apparatus can be realized.

According to one aspect of the present invention, a method for reducing the number of matrix operations when converting digitized RGB color space signals to digitized YCbCr color space signals comprises the steps of generating at least two color difference signals, each being in terms of any two of the digitized RGB color space signals, and performing first, second, third and fourth matrix multiplication operations of the color difference signals, the first and second matrix multiplication operations having first and second results to be used in conversion for the digitized Y color space signal, the third matrix multiplication operation having a third result to be used in conversion for the digitized Cb color space signal, the fourth matrix multiplication operation having a fourth result to be used in conversion for the digitized Cr color space signal.

According to another aspect of the present invention, an apparatus for reducing the number of matrix operations when converting digitized RGB color space signals to digitized YCbCr color space signals comprises means for generating at least two color difference signals, each being in terms of any two of the digitized RGB color space signals, and means for performing first, second, third and fourth matrix multiplication operations of the color difference signals, the first and second matrix multiplication operation performing means having first and second results to be used in conversion for the digitized Y color space signal, the third matrix multiplication operation performing means having a third result to be used in conversion for the digitized Cb color space signal, the fourth matrix multiplication operation performing means having a fourth result to be used in conversion for the digitized Cr color space signal.

The Y color space signal is obtained by combining the first and second results of the first and second matrix multiplication operations and one of the digitized RGB color space signals to obtain a resultant sum, and by clipping the resultant sum that is between a range that represents the binary code of the Y color space signal.

The Cb and Cr color signals can be obtained by performing arithmetic right-shift operation of one of the color difference signals to obtain a fifth result, combining one of the third and fourth results of the third and fourth matrix multiplication operations with the fifth result of the arithmetic right-shift operation to obtain a resultant sum, compensating a constant to the resultant sum to obtain a compensated result, and clipping the compensated result the between a range that represents the binary code of the Cb or Cr color space signal. Alternatively, the Cb and Cr color signals can be obtained by combining one of the third and fourth result s of the third and fourth matrix multiplication operations with one of the color difference signals to obtain a resultant sum, performing arithmetic right-shift operation of the resultant sum to obtain a fifth result, compensating a constant to the fifth result to obtain a compensated result, and clipping the compensated result that is between a range that represents the binary code of the Cb or Cr color space signal.

Preferably, the color difference signals are generated simultaneously, and the first, second, third and fourth matrix multiplication operations are performed simultaneously. In addition, each of the first, second, third and fourth matrix multiplication operations may be implemented as a look-up table unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
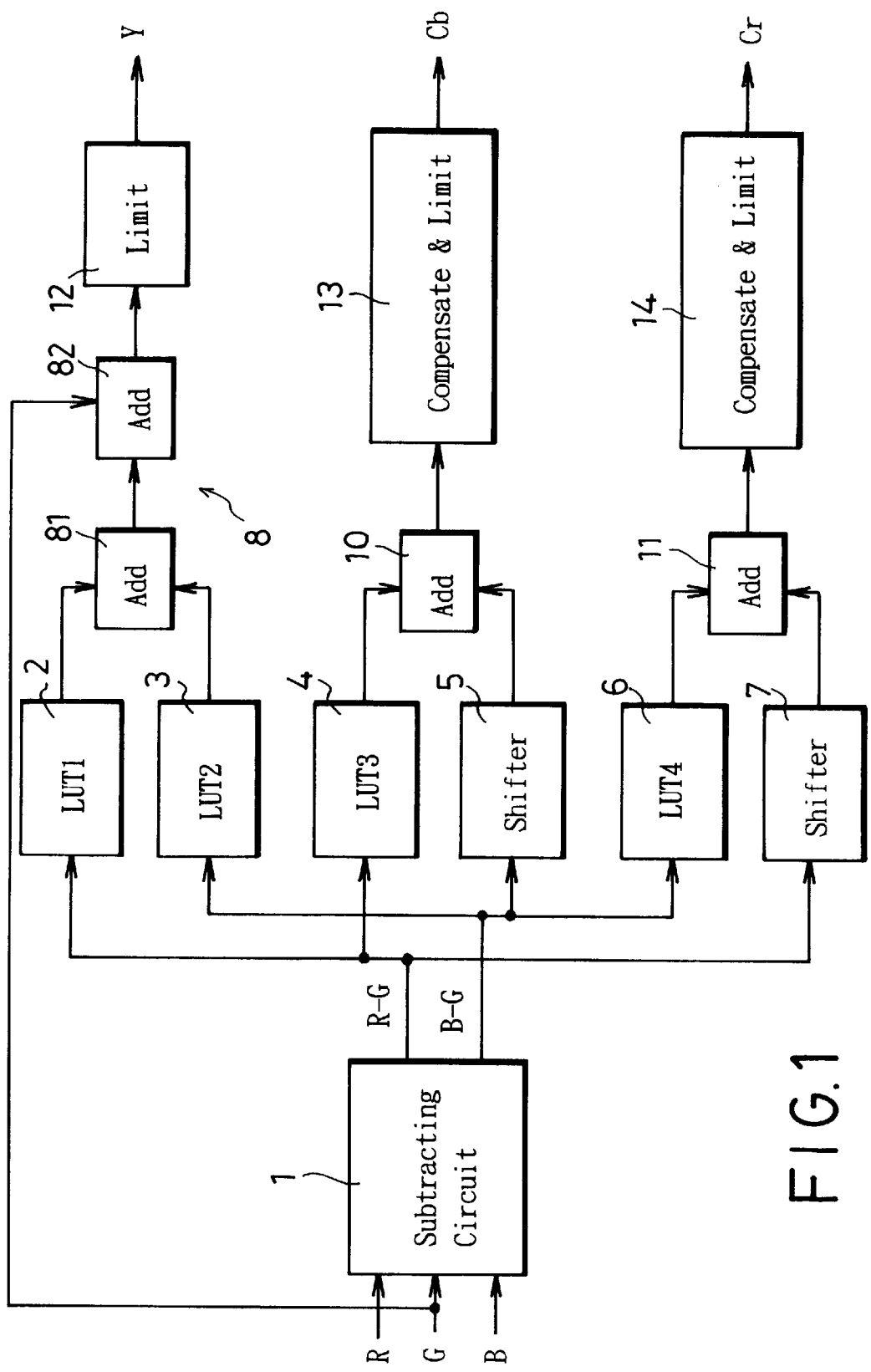
FIG. 1 is a schematic circuit block diagram of the first preferred embodiment of a color space converting apparatus according to the present invention.

Before the present invention is described in greater detail, it should be noted that like elements are denoted by the same reference numerals throughout the disclosure.

Referring to FIG. 1, the first preferred embodiment of a color space converting apparatus for converting digitized RGB color space signals to digitized YCbCr color space signals in accordance with this invention is shown to comprise a subtracting circuit 1, first to fourth matrix multiplication units 2, 3, 4 and 6, first and second arithmetic right-shift units 5 and 7, first to third combining units 8, 10 and 11, a limit circuit 12, and first and second compensate-and-limit circuits 13 and 14. In this embodiment, color space conversion is performed according to the following equations:

$$Y=G+0.299(R-G)+0.114(B-G) \tag{c.2}$$

$$Cb=0.5(B-G)-0.169(R-G)+128 \tag{d.1}$$

$$Cr=0.5(R-G)-0.081(B-G)+128 \tag{e.1}$$

The subtracting circuit 1 receives the digitized R, G and B color signals and generates (R-G) and (B-G) color difference signals therefrom. The matrix multiplication units 2, 3, 4 and 6 are preferably implemented as look-up table units (LUT1–LUT4). The color difference signals are directed to the first and second matrix multiplication units 2 and 3, which contain digitized transformation values for performing the matrix multiplications of 0.299(R-G) and 0.114(B-G) respectively for two of the three components of the Y conversion formula. The first combining unit 8 comprises a first adder 81 for adding the outputs of the first and second matrix multiplication units 2 and 3, and a second adder 82 for adding the output of the first adder 81 to the digitized G color space signal. The output of the second adder 82 is clipped by the limit circuit 12 so that the resulting output is within a range that represents the binary code of the Y color space signal.

The color difference signals are further directed to the third and fourth matrix multiplication units 4 and 6, which contain digitized transformation values for performing the matrix multiplications of −0.169(R-G) and −0.081(B-G) respectively, and to the first and second arithmetic right-shift units 5 and 7 for performing the matrix multiplications of 0.5(B-G) and 0.5(R-G) respectively. The second combining unit 10 includes an adder for adding the outputs of the third matrix multiplication unit 4 and the first arithmetic right-shift unit 5. The first compensate-and-limit circuit 13 is used to compensate the constant value of 128 to the output of the second combining unit 10 and to clip the result so as to be within a range that represents the binary code of the Cb color space signal. The third combining unit 11 includes an adder for adding the outputs of the fourth matrix multiplication unit 6 and the second arithmetic right-shift unit 7. The second compensate-and-limit circuit 14 is used to compensate the constant value of 128 to the output of the third combining unit 11 and to clip the result so as to be within a range that represents the binary code of the Cr color space signal.

Figure 2:
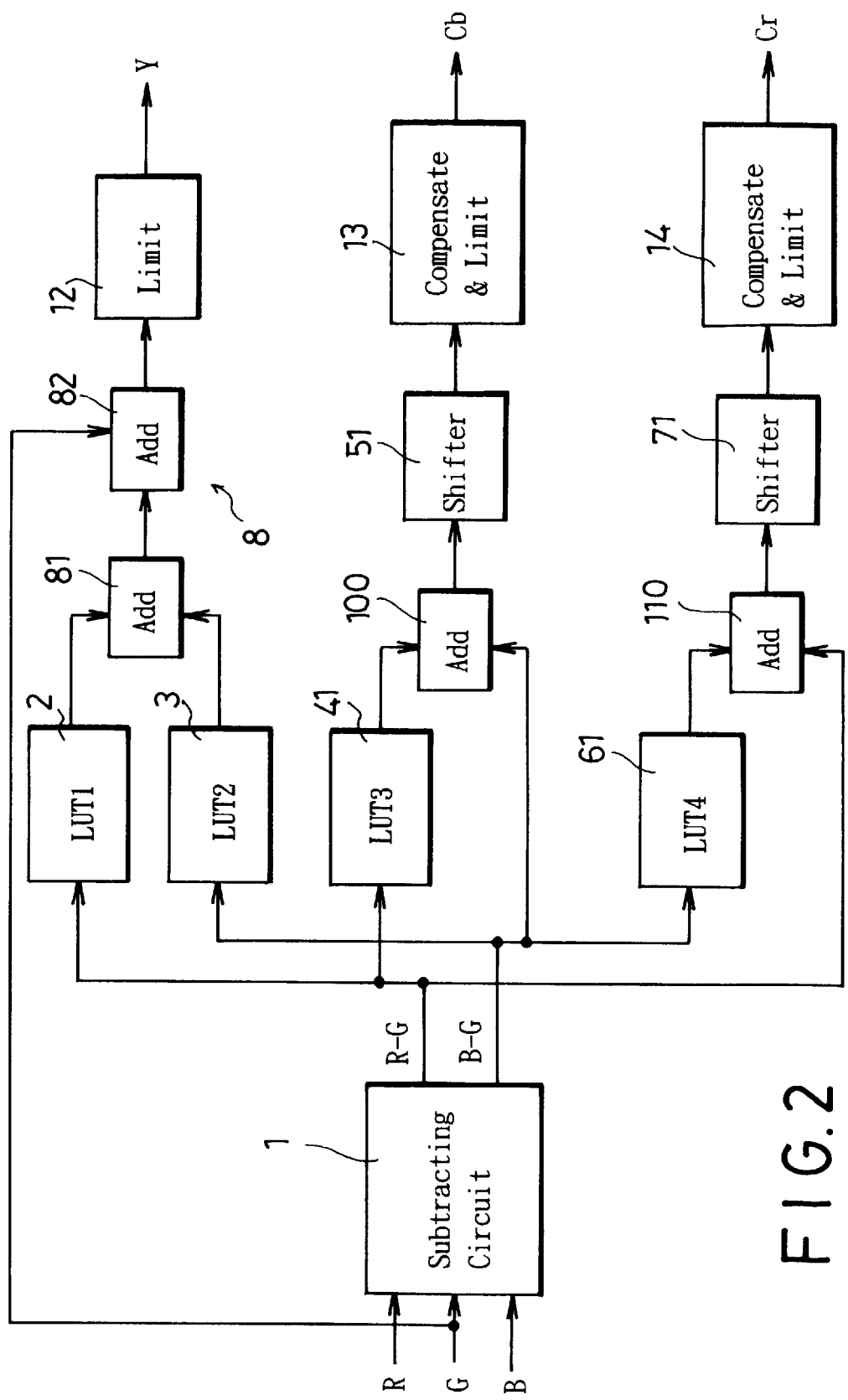
FIG. 2 is a schematic circuit block diagram of the second preferred embodiment of a color space converting apparatus according to the present invention.

Referring to FIG. 2, the second preferred embodiment of a color space converting apparatus for converting digitized RGB color space signals to digitized YCbCr color space signals in accordance with this invention is shown to comprise a subtracting circuit 1, first to fourth matrix multiplication units 2, 3, 41 and 61, first and second arithmetic right-shift units 51 and 71, first to third combining units 8, 100 and 110, a limit circuit 12, and first and second compensate-and-limit circuits 13 and 14. In this embodiment, color space conversion is performed according to the following equations:

$$Y=G+0.299(R-G)+0.114(B-G) \tag{c.2}$$

$$Cb = 0.5[(B-G) - 0.338(R-G)] + 128 \qquad (d.3)$$

$$Cr = 0.5[(R-G) - 0.162(B-G)] + 128 \qquad (e.3)$$

The subtracting circuit 1, the first and second matrix multiplication units 2 and 3, the first combining unit 8, and the limit circuit 12 operate in a manner similar to that of the previous embodiment and will not be described further.

The color difference signals from the subtracting circuit 1 are directed to the third and fourth matrix multiplication units 41 and 61, which contain digitized transformation values for performing the matrix multiplications of −0.338(R-G) and −0.162(B-G) respectively, and to the third and second combining units 110 and 100, respectively. The outputs of the second and third combining units 100 and 110 are received by the first and second arithmetic right-shift units 51 and 71, respectively. The first compensate-and-limit circuit 13 compensates the constant value of 128 to the output of the first arithmetic right-shift unit 51 and clips the result which is within a range that represents the binary code of the Cb color space signal. The second compensate-and-limit circuit 14 compensates the constant value of 128 to the output of the second arithmetic right-shift unit 71 and clips the result so as to be within a range that represents the binary code of the Cr color space signal.

Figure 3:
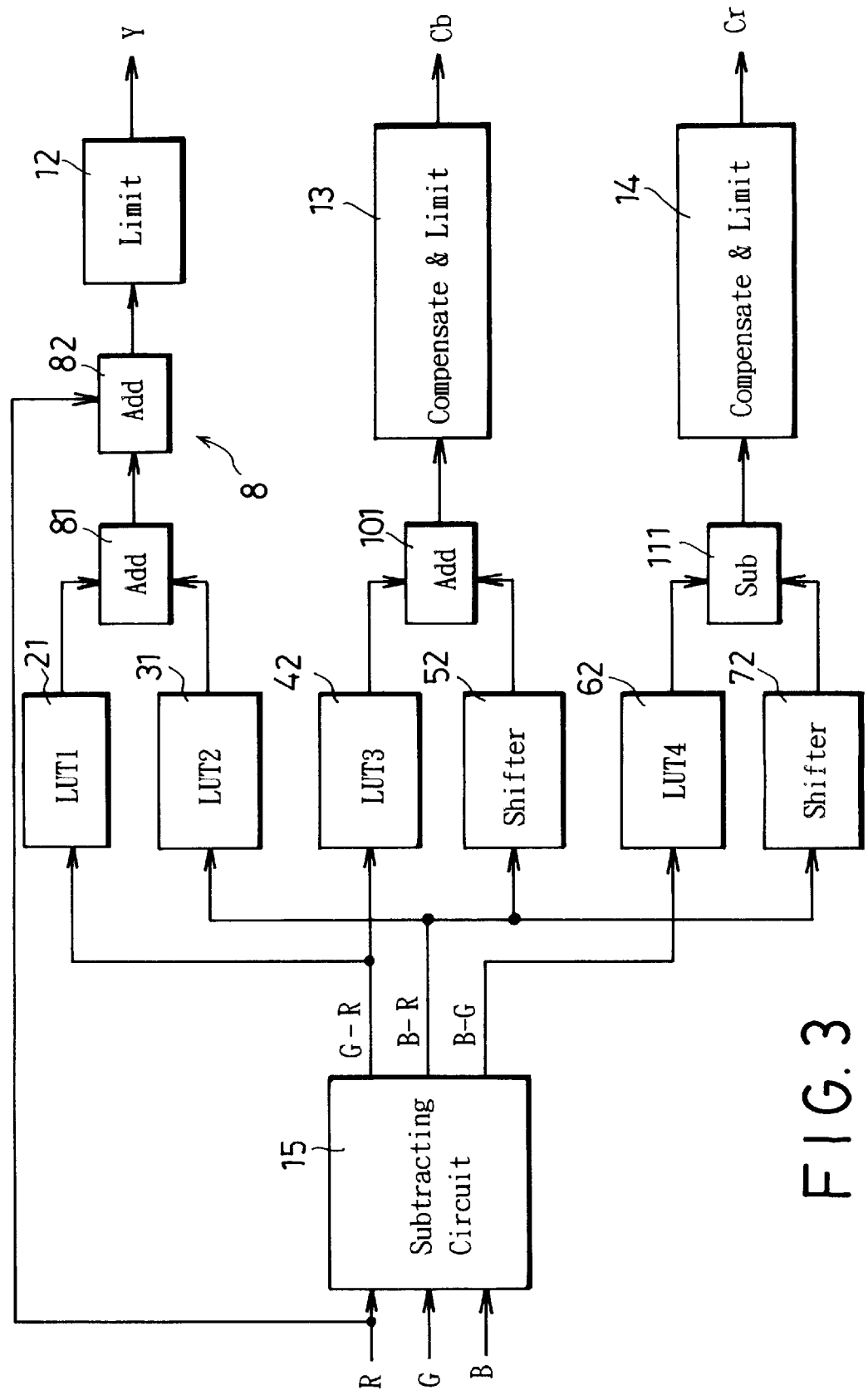
FIG. 3 is a schematic circuit block diagram of the third preferred embodiment of a color space converting apparatus according to the present invention.

Referring to FIG. 3, the third preferred embodiment of a color space converting apparatus for converting digitized RGB color space signals to digitized YCbCr color space signals in accordance with this invention is shown to comprise a subtracting circuit 15, first to fourth matrix multiplication units 21, 31, 42 and 62, first and second arithmetic right-shift units 52 and 72, first to third combining units 8, 101 and 111, a limit circuit 12, and first and second compensate-and-limit circuits 13 and 14. In this embodiment, color space conversion is performed according to the following equations:

$$Y = R + 0.587(G-R) + 0.114(B-R) \qquad (c.1)$$

$$Cb = 0.5(B-R) - 0.331(G-R) + 128 \qquad (d.2)$$

$$Cr = 0.419(B-G) - 0.5(B-R) + + 128 \qquad (e.2)$$

The subtracting circuit 15 receives the R, G and B color signals and generates (G-R), (B-R) and (B-G) color difference signals therefrom. The matrix multiplication units 21, 31, 42 and 62 are preferably implemented as look-up table units (LUT1–LUT4). The (G-R) and (B-R) color difference signals are directed to the first and second matrix multiplication units 21 and 31, which contain digitized transformation values for performing the matrix multiplications of 0.587(G-R) and 0.114(B-R) respectively for two of the three components of the Y conversion formula. The first combining unit 8 comprises a first adder 81 for adding the outputs of the first and second matrix multiplication units 21 and 31, and a second adder 82 for adding the output of the first adder 81 to the digitized R color space signal. The output of the second adder 82 is clipped by the limit circuit 12 so that the resulting output is within a range that represents the binary code of the Y color space signal.

The (G-R) and (B-G) color difference signals are directed to the third and fourth matrix multiplication units 42 and 62, which contain digitized transformation values for performing the matrix multiplications of −0.331(G-R) and 0.419(B-G), respectively. The (B-R) color difference signal is directed to the first and second arithmetic right-shift units 52 and 72 for performing the matrix multiplications of 0.5(B-R), respectively. The second combining unit 101 includes an adder for adding the outputs of the third matrix multiplication unit 42 and the first arithmetic right-shift unit 52. The first compensate-and-limit circuit 13 is used to compensate the constant value of 128 to the output of the second combining unit 101 and to clip the result which is within a range that represents the binary code of the Cb color space signal. The third combining unit 111 includes a subtracter for subtracting the output of the second arithmetic right-shift unit 72 from that of the fourth matrix multiplication unit 62. The second compensate-and-limit circuit 14 is used to compensate the constant value of 128 to the output of the third combining unit 111 and to clip the result which is within a range that represents the binary code of the Cr color space signal.

Although the preferred embodiments are shown as hard-wired blocks in a dedicated hardware circuitry, the present invention may be easily and efficiently implemented by a programmed microcomputer using a microprocessor and the associated system memory to implement the calculation of the conversion.

It has thus been shown that, in the present invention, RGB to YCbCr color space conversion can be implemented using only four matrix multiplication operations in a single operating stage. Thus, a relatively inexpensive and highly efficient color space converting method and apparatus can be realized. The objective of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for reducing the number of matrix operations when converting digitized RGB color space signals to digitized YCbCr color space signals comprising the steps of:
   generating at least two color difference signals, each being in terms of any two of the digitized RGB color space signals; and
   performing first, second, third and fourth matrix multiplication operations of said color difference signals, said first and second matrix multiplication operations having first and second results to be used in conversion for the digitized Y color space signal, said third matrix multiplication operation having a third result to be used in conversion for the digitized Cb color space signal, said fourth matrix multiplication operation having a fourth result to be used in conversion for the digitized Cr color space signal.

2. The method as claimed in claim 1 further comprising the step of combining the first and second results of said first and second matrix multiplication operations and one of the digitized RGB color space signals to obtain a resultant sum.

3. The method as claimed in claim 2 further comprising the step of clipping the resultant sum that is between a range that represents the binary code of the Y color space signal.

4. The method as claimed in claim 1 further comprising the steps of performing arithmetic right-shift operation of one of said color difference signals to obtain a fifth result, and combining the third result of said third matrix multiplication operation and the fifth result of said arithmetic right-shift operation to obtain a resultant sum.

5. The method as claimed in claim 4 further comprising the step of compensating a constant to the resultant sum to obtain a compensated result, and clipping the compensated result that is between a range that represents the binary code of the Cb color space signal.

6. The method as claimed in claim 1 further comprising the steps of performing arithmetic right-shift operation of one of said color difference signals to obtain a fifth result, and combining the fourth result of said fourth matrix multiplication operation and the fifth result of said arithmetic right-shift operation to obtain a resultant sum.

7. The method as claimed in claim 6 further comprising the step of compensating a constant to the resultant sum to obtain a compensated result, and clipping the compensated result that is between a range that represents the binary code of the Cr color space signal.

8. The method as claimed in claim 1 further comprising the steps of combining the third result of said third matrix multiplication operation and one of said color difference signals to obtain a resultant sum, and performing arithmetic right-shift operation of the resultant sum to obtain a fifth result.

9. The method as claimed in claim 8 further comprising the steps of compensating a constant to the fifth result to obtain a compensated result, and clipping the compensated result that is between a range that represents the binary code of the Cb color space signal.

10. The method as claimed in claim 1 further comprising the steps of combining the fourth result of said fourth matrix multiplication operation and one of said color difference signals to obtain a resultant sum, and performing arithmetic right-shift operation of the resultant sum to obtain a fifth result.

11. The method as claimed in claim 10 further comprising the steps of compensating a constant to the fifth result to obtain a compensated result, and clipping the compensated result that is between a range that the represents binary code of the Cr color space signal.

12. The method as claimed in claim 1 wherein said color difference signals are generated simultaneously.

13. The method as claimed in claim 1 wherein said first, second, third and fourth matrix multiplication operations are performed simultaneously.

14. An apparatus for reducing number of matrix operations when converting digitized RGB color space signals to digitized YCbCr color space signals comprising:

means for generating at least two color difference signals, each being in terms of any two of the digitized RGB color space signals; and means for performing first, second, third and fourth matrix multiplication operations of said color difference signals, said first and second matrix multiplication operation performing means having first and second results to be used in conversion for the digitized Y color space signal, said third matrix multiplication operation performing means having a third result to be used in conversion for the digitized Cb color space signal, said fourth matrix multiplication operation performing means having a fourth result to be used in conversion for the digitized Cr color space signal.

15. The apparatus as claimed in claim 14 further comprising means for combining the first and second results of said first and second matrix multiplication operation performing means and one of the digitized RGB color space signals to obtain a resultant sum.

16. The apparatus as claimed in claim 15 further comprising means for clipping the resultant sum that is between a range that represents the binary code of the Y color space signal.

17. The apparatus as claimed in claim 14 further comprising means for performing arithmetic right-shift operation of one of said color difference signals to obtain a fifth result, and means for combining the third result of said third matrix multiplication operation performing means and the fifth result of said arithmetic right-shift operation performing means to obtain a resultant sum.

18. The apparatus as claimed in claim 17 further comprising means for compensating a constant to the resultant sum to obtain a compensated result, and for clipping the compensated result that is between a range that represents the binary code of the Cb color space signal.

19. The apparatus as claimed in claim 14 further comprising means for performing arithmetic right-shift operation of one of said color difference signals to obtain a fifth result, and means for combining the fourth result of said fourth matrix multiplication operation performing means and the fifth result of said arithmetic right-shift operation performing means to obtain a resultant sum.

20. The apparatus as claimed in claim 19 further comprising means for compensating a constant to the resultant sum to obtain a compensated result, and for clipping the compensated result that is between a range that represents the binary code of the Cr color space signal.

21. The apparatus as claimed in claim 14 further comprising means for combining the third result of said third matrix multiplication operation performing means and one of said color difference signals to obtain a resultant sum, and means for performing arithmetic right-shift operation of the resultant sum to obtain a fifth result.

22. The apparatus as claimed in claim 21 further comprising means for compensating a constant to the fifth result to obtain a compensated result, and for clipping the compensated result that is between a range that represents the binary code of the Cb color space signal.

23. The apparatus as claimed in claim 14 further comprising means for combining the fourth result of said fourth matrix multiplication operation performing means and one of said color difference signals to obtain a resultant sum, and means for performing arithmetic right-shift operation of the resultant sum to obtain a fifth result.

24. The apparatus as claimed in claim 23 further comprising means for compensating a constant to the fifth result to obtain a compensated result, and for clipping the compensated result that is between a range that represents the binary code of the Cr color space signal.

25. The apparatus as claimed in claim 14 wherein each of said first, second, third and fourth matrix multiplication operation performing means includes a look-up table unit.

* * * * *